Nov. 5, 1957 G. H. DEWITZ 2,812,389

MAGNETIC AMPLIFIER

Filed April 19, 1952 2 Sheets-Sheet 1

INVENTOR
GERHARD H. DEWITZ
BY
Curtis, Morris & Safford
ATTORNEYS

Nov. 5, 1957 G. H. DEWITZ 2,812,389

MAGNETIC AMPLIFIER

Filed April 19, 1952 2 Sheets-Sheet 2

INVENTOR
GERHARD H. DEWITZ
BY
Curtis, Morris & Safford
ATTORNEYS

United States Patent Office 2,812,389

Patented Nov. 5, 1957

2,812,389

MAGNETIC AMPLIFIER

Gerhard H. Dewitz, Westport, Conn., assignor to C. G. S. Laboratories, Inc., Stamford, Conn., a corporation of Connecticut Application April 19, 1952, Serial No. 283,185

3 Claims. (Cl. 179—171)

This invention is in the field of electrical amplification and relates particularly to magnetic amplifiers having control elements formed of electrically-conductive magnetically-permeable material wherein the skin-effect resistance is controlled by transverse magnetic flux.

The utility of known magnetic amplifiers has been relatively limited, even though their ruggedness and other characteristics are particularly desirable. One reason for this limited use is that magnetic amplifiers will amplify only signals in which the change in amplitude is relatively slow, that is, the amplifiers will handle only signals having relatively low frequency components. Another difficulty with prior magnetic amplifiers is that it is usually difficult to connect the amplifiers in cascade to obtain high amplification, either because of instability or because a separate source of high frequency voltage is required for each stage.

In accordance with the present invention, a novel amplifier arrangement is provided which, in a large measure, overcomes the deficiencies of prior magnetic amplifier systems, and permits the use of magnetic amplifiers for applications where they have heretofore been impractical. For example, magnetic amplifiers can be constructed in accordance with the present invention that will amplify signals having frequency components of several megacycles. Moreover, the amplifier is such that a number of magnetic amplifiers may be connected in cascade, utilizing a single high frequency generator to provide the carrier signal for all of the stages.

In a preferred embodiment of the inevntion, a high frequency current is caused to flow through a magnetically permeable material in such manner that the magnitude of the current is limited by the skin effect of the permeable material. The signal which is to be amplified is arranged to produce transverse magnetic flux in the permeable material; this flux partially saturates the material lowering its incremental permeability and reducing the skin-effect resistance. The variations in the magnitude of the high frequency current therefore are a function of the variations in the magnitude of the control signal. Advantageously, any tendency for interaction between the high frequency current and the control signal is reduced by the transverse application of the control flux.

Figure 1:
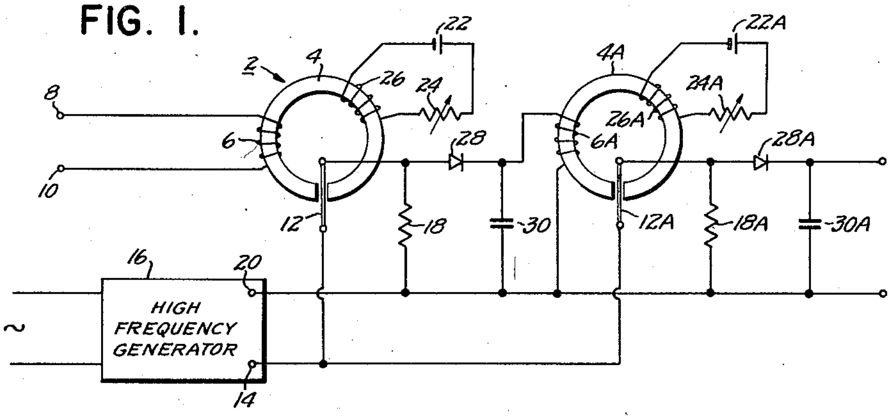
Figure 1 is a diagrammatic representation of a two-stage amplifier embodying the present invention.
Figure 2:
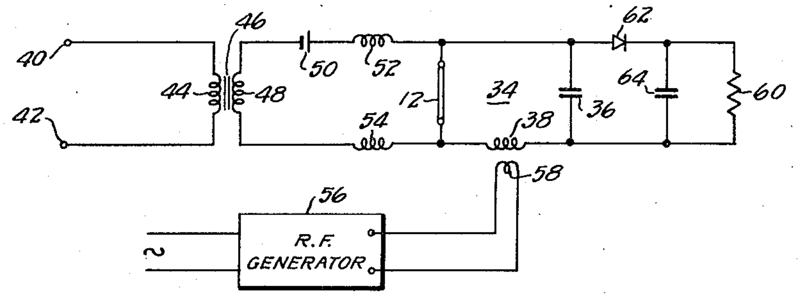
Figure 2 is a modified amplifier using a resonant circuit in which the control flux is produced by a current through the control element.
Figure 3:
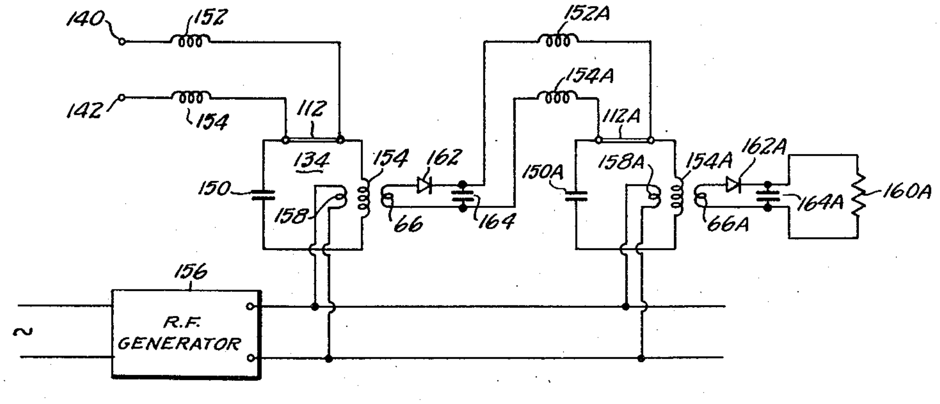
Figure 3 shows another multi-stage amplifier in which the successive stages and the output circuit are inductively coupled.
Figure 4:
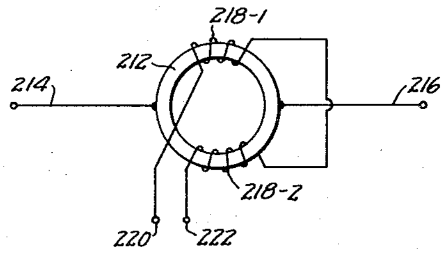
Figure 5:
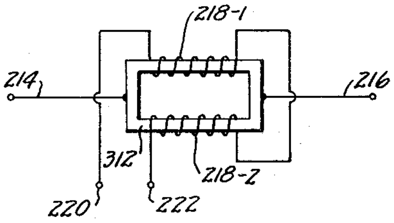
Figure 6:
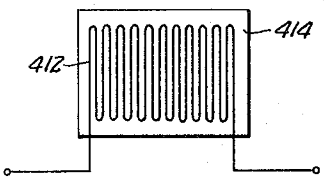
Figure 7:
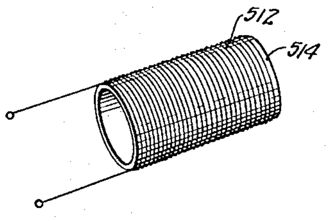

Figures 4, 5, and 6 show modified forms of control elements useful in the magnetic amplifiers of Figures 1 to 3;

Figure 7 shows still another control element; and

Figure 8:
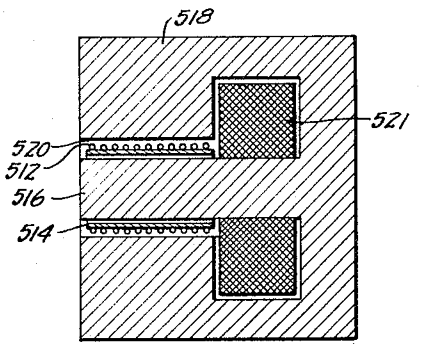

Figure 8 shows a magnetic yoke structure for use with the control element of Figure 7.

As shown in Figure 1, the magnetic amplifier includes an electromagnet structure, generally indicated at 2, having a core 4 of magnetic material and an energizing winding 6 connected to two input terminals 8 and 10. This winding carries the signals which are to be amplified. A small wire 12, formed of soft iron, extends through a gap between the pole faces of the core 4 so that the magnetic field surrounding the wire 12 is transverse thereto and varies with variations in the input signal applied to the terminals 8 and 10.

One end of this wire 12 is connected to an output terminal 14 of a high-frequency generator 16, for example delivering a power signal of constant amplitude and having a frequency of 250 kilocycles; the other end of this wire 12 is connected through a load resistor 18 to the other terminal 20 of the high-frequency generator 16.

The wire 12 which serves as a control element is made of material having high permeability—such as soft iron or, for higher permeability, iron-nickel alloys such as mu-metal, "Kovar," Permalloy, or the like. The flow of high frequency current through such an element is limited by the skin-effect resistance of the wire element; that is, the high frequency current tends to flow near the outside surface of the wire causing the high frequency resistance to be substantially higher than the resistance to direct or low frequency current. This effect is more pronounced in materials having high magnetic permeability. However, as the magnetic material becomes saturated, its incremental permeability drops and accordingly decreases its skin-effect resistance.

Thus, the amount of high frequency current that can flow in the circuit which includes the wire 12 and the load resistor 18 can be varied by varying the effective permeability of the wire 12. The effective permeability of the wire 12 is a function of the extent of the magnetic saturation of the wire and so of the intensity of the magnetic field surrounding this wire. Accordingly, the resistance to the flow of the radio frequency current from generator 16 through the wire 12 depends upon the strength of the magnetic field produced by the electromagnet 2; this, in turn, depends upon the magnitude of the current flowing through the control winding 6. Accordingly, if the signal to be amplified, which is applied to the terminals 8 and 10, is increased in magnitude, thus producing an increase in the intensity of the magnetic field, the skin-effect resistance of the wire 12 is reduced, causing a larger amount of current to flow through the wire 12 and through the resistance 18, and accordingly increasing the radio frequency voltage across the load resistor 18. The wire 12 thus serves as a control element by which a small amount of power or a small current can be used to control the flow of a larger amount of power or current. Any tendency for the high frequency current to interact with the magnetic control circuit is reduced as a result of the transverse application of the control flux.

In order to provide a suitable operating bias for the electromagnet 2, a constant source of potential indicated in the form of a battery 22 is connected in series with a variable resistance 24 across a bias winding 26 on the core 2. This partial magnetization of the core 2 is such as to achieve the desired operating characteristics with the particular range of signal amplitudes to be handled. This magnetic bias can be obtained by other means, as by using a permanent magnet, or by taking advantage of the residual magnetism of the core 2.

One end of the resistor 18 is connected through a half-wave rectifier 28 to one end of a control winding 6A of a second magnetic amplifier stage. The other end of the load resistor 18 is connected to the other end of the control winding 6A. A filter capacitor 30 is connected across the winding 6A and offers a low impedance to the flow of current at the frequency of the power generator 16 but a relatively high impedance to the flow of the highest frequency components of the signals being amplified. A bridge rectifier circuit with a matching transformer will be found useful in many applications.

The second amplifier stage is identical in operation with the stage just described and the corresponding parts have been given the same reference numbers followed by the suffix "A."

Another magnetic amplifier arrangement is shown in Figure 2 in which the iron-wire control element 12 is placed in a resonant circuit, generally indicated at 34, and varies the Q of this circuit as a function of the magnitude of the signal to be amplified. The resonant circuit consists of a capacitor 36 and an inductor 38 connected to form a parallel resonant circuit, with the wire 12 connected in one branch between the capacitor and the inductor.

In this example, the magnetic saturation of the wire 12 is controlled by sending the signal current to be amplified directly through the wire 12. The signal to be amplified is applied to two input terminals 40 and 42 that are connected to a primary winding 44 of a transformer 46. One end of the secondary winding 48 of this transformer is connected through a bias battery 50 and a radio-frequency isolation choke 52 to one end of the wire 12. The other end of this winding 48 is connected through a second radio-frequency isolation choke 54 to the other end of wire 12.

The bias battery 50 serves to keep the signal current flowing in one direction through the wire 12 while the magnitude of this current varies in accordance with the alternating signal components applied through the transformer 46. The magnetic saturation and accordingly the skin-effect resistance of the wire 12 therefore varies with the magnitude of the signals that are to be amplified.

The resonant circuit 34 is energized at or near its resonant frequency from a radio-frequency power generator that delivers a constant-frequency constant-voltage signal. The radio frequency energy from the generator 56 is transferred to the circuit 34 through a winding 58 that is coupled inductively to the coil 38.

As the Q of the resonant circuit varies with changes in the magnetic saturation of the control element 12, the current in the resonant circuit varies as does the radio-frequency voltage across the condenser 36. This voltage is coupled to any desired load circuit, represented diagrammatically by a resistor 60, through a rectifier 62. A condenser 64 is connected across the resistor 60 to bypass the high frequency current.

Figure 3 shows a multiple-stage amplifier similar in operation to the arrangement shown in Figure 2; in this instance the output circuit is inductively coupled to the resonant circuit. Parts corresponding to those of Figure 2 and performing similar functions have been given similar numbers to which one hundred has been added.

The high frequency signal, modulated by the lower-frequency signal applied to the input terminals 140 and 142, is coupled from the resonant circuit 134 by means of a pick-up or secondary winding 66. This signal is rectified and the low frequency component applied to the control element 112A of the second stage. The second stage is identical in operation to the first stage, the corresponding parts bearing similar reference numerals followed by the suffix "A."

Figures 4 to 8 show other skin-effect control elements that may be used in the above magnetic amplifiers and also in other applications where a controllable radio-frequency resistor is desired. In Figure 4, a ring 212 of iron or other high permeability material is connected between two radio frequency leads 214 and 216; these leads are connected to diametrically opposed points on the ring 212 so that the current divides equally around the two halves of the ring.

A control winding 218 is formed of two portions 218–1 and 218–2 which are connected in series and wound on opposite halves of the ring 212; these windings are connected so that they produce flux lines around the ring 212 but do not couple inductively to the radio frequency current. The winding 218 is connected to the control terminals 220 and 222 and carries the current that controls the magnitude of the radio-frequency current flowing between the leads 214 and 216 through the control element 212. A tunable control arrangement is obtainable by placing a capacitor in series to the terminal 220.

Figure 5 shows an arrangement similar to Figure 4 except that the permeable control element 312 is rectangular in shape with the control winding 218 distributed along opposite sides of the rectangle.

Figure 6 shows a control element 412 in which a substantial length of iron wire is wound between two sheets of mica 414. The wire 412 is wound in such fashion as to minimize inductive effects. This control element is particularly suitable for use in the arrangement shown in Figure 1.

Figure 7 shows an iron wire control element 512 supported on a tubular non-magnetic form 514. The wire 512 is arranged as a bifilar winding to minimize inductive effects.

In use, the form 514 is positioned over a magnetic core 516 (Figure 8) which is connected at one end to an outer magnetic yoke 518 that has a bore 520 into which the inner core portion 516 extends, so that an annular gap is produced. The wire 512 is positioned in this annular gap. The magnetic field in the gap is controlled by a winding 521 around the core portion 516 and is transverse to the winding 512.

It will be apparent from the foregoing that the magnetic amplifiers and control elements set forth herein are well-adapted to attain the ends and objects set forth above, and the illustrative circuits set forth here are subject to many modifications in accordance with the particular conditions associated with each particular use.

I claim:

1. A magnetic amplifier comprising a source of high-frequency current, a wire formed of electrically-conductive magnetically permeable material having significant skin-effect resistance at the frequency of said current, a first circuit coupling said source to said wire, an input circuit, an electromagnet adjacent said wire and arranged to establish a magnetic field passing transversely through said wire, said electromagnet being coupled to said input circuit and arranged to vary the transverse magnetic saturation of said wire in accordance with variations in voltage applied to said input circuit, an output circuit coupled to said wire, and rectifying means included in said output circuit.

2. A magnetic amplifier comprising a source of high-frequency current, an electromagnet, an elongated control element formed of electrically-conductive magnetically permeable material having significant skin-effect resistance at the frequency of said current and positioned in the gap of said electromagnet with its length transversely to the magnetic flux in said gap, a first circuit coupling said source to said control element, an input circuit, a second circuit coupling said input circuit to said electromagnet and arranged to vary the transverse magnetic saturation of said control element in accordance with variations in voltage applied to said input circuit, a constant-intensity bias means arranged to pre-magnetize said electromagnet independently of the voltage applied to said input circuit, an output circuit coupled to said control element, and rectifying means included in said output circuit.

3. A magnetic amplifier as claimed in claim 1 and wherein said electromagnet has an annular gap and said wire is positioned in the annular gap transversely to the magnetic field of said electromagnet.

(References on following page)

References Cited in the file of this patent

UNITED STATES PATENTS

| | | |
|---|---|---|
| 1,544,381 | Elmen et al. | June 30, 1925 |
| 1,730,254 | Thomas | Oct. 1, 1929 |
| 1,810,539 | Sokoloff | June 16, 1931 |
| 2,075,380 | Varian | Mar. 30, 1937 |
| 2,108,642 | Boardman | Feb. 15, 1938 |
| 2,197,123 | King | Apr. 16, 1940 |
| 2,500,953 | Libman | Mar. 21, 1950 |
| 2,571,915 | McCoubrey | Oct. 16, 1951 |

FOREIGN PATENTS

| | | |
|---|---|---|
| 481,255 | Great Britain | Mar. 8, 1938 |